(12) United States Patent  
Johansson et al.

(10) Patent No.: US 9,354,744 B2
(45) Date of Patent: May 31, 2016

(54) ADAPTIVE TOUCH PANEL SYNCHRONIZATION

(71) Applicant: Sony Corporation, Tokyo (JP)

(72) Inventors: Magnus Ola Johansson, Dösjebro (SE); Magnus Midholt, Lund (SE); Olivier Thierry Nicolas Moliner, Lund (SE); Alexander Leonard Hunt, Tygelsjö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/299,173

(22) Filed: Jun. 9, 2014

(65) Prior Publication Data

US 2015/0355774 A1 Dec. 10, 2015

(51) Int. Cl.
*G06F 3/041* (2006.01)
*G09G 3/20* (2006.01)

(52) U.S. Cl.
CPC .............. *G06F 3/0416* (2013.01); *G06F 3/041* (2013.01); *G09G 3/20* (2013.01); *G09G 2310/08* (2013.01)

(58) Field of Classification Search
None
See application file for complete search history.

(56) References Cited

U.S. PATENT DOCUMENTS

| 8,487,896 B1* | 7/2013 | Brown ................... G06F 3/0418 345/173 |
| 8,917,249 B1* | 12/2014 | Buuck et al. .................. 345/173 |
| 2008/0062140 A1* | 3/2008 | Hotelling ............. G09G 3/3648 345/173 |
| 2012/0154322 A1* | 6/2012 | Yang ...................... G06F 3/0416 345/174 |
| 2013/0100071 A1* | 4/2013 | Wright ..................... G06F 3/044 345/174 |
| 2013/0194195 A1* | 8/2013 | Parekh .................. G06F 3/0416 345/173 |
| 2013/0314360 A1* | 11/2013 | Saitoh .................... G06F 3/0412 345/173 |
| 2014/0015803 A1 | 1/2014 | Drumm |
| 2014/0204036 A1* | 7/2014 | Schillings ........... G06F 3/04883 345/173 |
| 2015/0116266 A1* | 4/2015 | Inoue et al. .................... 345/174 |
| 2015/0194137 A1* | 7/2015 | Wyatt ............................ 345/173 |

FOREIGN PATENT DOCUMENTS

EP 2620843 7/2013

OTHER PUBLICATIONS

International Search Report and Written Opinion dated Feb. 20, 2015 for related International Application No. PCT/IB2014/066084.

* cited by examiner

*Primary Examiner* — Dismery Mercedes
(74) *Attorney, Agent, or Firm* — Tucker Ellis LLP (57) ABSTRACT

A method, a device, and a non-transitory storage medium having instructions to receive a touch event originating from a touch panel; compare a timing of the touch event and a timing of a display refresh event; determine whether to adjust a time during which a next scan of the touch panel occurs based on a comparison of the timing of the touch event and the timing of the display refresh event; calculate a time value that indicates when the next scan occurs based on a determination to adjust the time; and adjust the time during which the next scan occurs based on the time value.

20 Claims, 10 Drawing Sheets

ADAPTIVE TOUCH PANEL SYNCHRONIZATION

BACKGROUND

A mobile device, such as a smartphone or a tablet device, offer various services to their users. Users may interact with the displays of the mobile devices via touch panels and/or touchless panels. While touch and touchless input technologies allow users a great deal of flexibility when operating the mobile devices, designers and manufacturers are continually striving to improve performance metrics, such as accuracy, latency, etc.

SUMMARY

According to one aspect, a method may comprise receiving, by a user device, a touch event originating from a touch panel; comparing, by the user device, a timing of the touch event and a timing of a display refresh event; determining, by the user device, whether to adjust a time during which a next scan of the touch panel occurs based on the comparing; calculating, by the user device, a time value that indicates when the next scan occurs based on determining to adjust the time; and adjusting, by the user device, the time during which the next scan occurs based on the time value.

Additionally, the determining may include calculating a time difference between the timing of the touch event and the timing of the display refresh event; comparing the time difference to a timing window that indicates a timing range; determining whether the time difference falls outside of the timing window; and adjusting the time during which the next scan occurs based on determining that the time difference falls outside of the timing window.

Additionally, the method may include obtaining display refresh events; calculating a display refresh rate based on the obtaining; and setting a scan rate for the touch panel based on the display rate.

Additionally, the method may include determining a type of application to which the touch event pertains; and determining whether to increase the scan rate, decrease the scan rate, or maintain the scan rate based on the type of application.

Additionally, the method may include obtaining scan rate events pertaining to the touch panel; calculating an estimated scan rate based on obtaining the scan rate events; and setting the scan rate based on the display refresh rate and the estimated scan rate.

Additionally, the method may include determining a battery level of the user device; and setting the scan rate based on the battery level.

Additionally, the method may include storing the time value in a register, wherein the time value is a time offset value or a timestamp value; and using the time value to set the time during which the next scan occurs.

According to another aspect, a user device may comprise a memory, wherein the memory stores software; and a processor, wherein the processor may execute the software to: receive a touch event originating from a touch panel; compare a timing of the touch event and a timing of a display refresh event; determine whether to adjust a time during which a next scan of the touch panel occurs based on a comparison of the timing of the touch event and the timing of the display refresh event; calculate a time value that indicates when the next scan occurs based on a determination to adjust the time; and adjust the time during which the next scan occurs based on the time value.

Additionally, the processor may further execute the software to calculate a time difference between the timing of the touch event and the timing of the display refresh event; compare the time difference to a timing window that indicates a timing range; determine whether the time difference falls outside of the timing window; and adjust the time during which the next scan occurs based on a determination that the time difference falls outside of the timing window.

Additionally, the software may include an operating system of the user device.

Additionally, the operating system may include a choreographer.

Additionally, the processor may further execute the software to obtain display refresh events; calculate a display refresh rate based on the obtained display refresh events; and set a scan rate for the touch panel based on the display rate, wherein the obtained display refresh events correspond to vertical synchronization signals.

Additionally, the processor may further execute the software to determine a type of application to which the touch event pertains; and determine whether to increase the scan rate, decrease the scan rate, or maintain the scan rate based on the type of application.

Additionally, the touch panel may include a panel with at least one of touch or touchless capabilities, and the user device may further comprise the touch panel and a display.

Additionally, the user device may be a mobile communicative device.

According to yet another aspect, a non-transitory storage medium that stores instructions executable by a processor of a computational device, which when executed, may cause the computational device to: receive an input event originating from an input device; compare a timing of the input event and a timing of a display refresh event; determine whether to adjust a time during which a next scan or sampling of the input device occurs based on a comparison of the timing of the input event and the timing of the display refresh event; calculate a time value that indicates when the next scan or sampling occurs based on a determination to adjust the time; and adjust the time during which the next scan or sampling occurs based on the time value.

Additionally, the instructions may comprise instructions to: calculate a time difference between the timing of the input event and the timing of the display refresh event; compare the time difference to a timing window; determine whether the time difference falls outside of the timing window; and adjust the time during which the next scan or sampling occurs based on a determination that the time difference falls outside of the timing window.

Additionally, the instructions may comprise instructions to: obtain display refresh events pertaining to a display; calculate a display refresh rate based on the obtained display refresh events; and set a scan rate or a sampling rate for the input device based on the display refresh rate, wherein the obtained display refresh events correspond to vertical synchronization signals.

Additionally, the instructions may comprise instructions to: determine a type of application to which the input event pertains; and determine whether to increase the scan rate or the sampling rate, decrease the scan rate or the sampling rate, or maintain the scan rate or the sampling rate based on the type of application. The input device may be one of a touch panel, a mouse, a tracking ball, or a sensor.

Additionally, the instructions may comprise instructions to: obtain scan rate events or sampling events pertaining to the input device; calculate an estimated scan rate or an estimated sampling rate based on the scan rate events or the sampling events; and set the scan rate or the sampling rate based on the display refresh rate and the estimated scan rate or the estimated sampling rate.

DETAILED DESCRIPTION OF PREFERRED EMBODIMENTS

The following detailed description refers to the accompanying drawings. The same reference numbers in different drawings may identify the same or similar elements.

Typically, there is no synchronization between the touch panel and the rest of the system of a user device, such as a mobile device. Even though the touch panel can be configured to operate at the same rate as the display, the touch panel and the display may operate out-of-phase. As a result, various problems can emerge including touch latency. For example, touch latency can increase by up to 16 milliseconds (ms) (e.g., one display refresh cycle).

According to an exemplary embodiment, a user device provides a synchronization service between a touch panel and/or a touchless panel (hereinafter referred to as a "touch panel") and a display. According to an exemplary embodiment, a display refresh rate of the display is calculated. According to an exemplary embodiment, based on the display refresh rate, a touch panel scan rate is set.

According to an exemplary embodiment, the display refresh rate and the touch panel scan rate are continuously monitored. According to an exemplary embodiment, if the display refresh rate differs from the touch panel scan rate by a threshold value (or more), the touch panel scan rate is adjusted.

According to an exemplary embodiment, an average delay between the reception of a touch event or a touchless event (hereinafter referred to as a "touch event") by the operating system and a next cycle of the display refresh rate is estimated. For example, an average delay between the reception of a touch event by the choreographer of the Android. OS and a next vertical synchronization (VSYNC) event (e.g., a VSYNC pulse) is estimated. If the average delay is outside a time range (e.g., a minimum value through a maximum value) or time value (e.g., a threshold time value), then a new start time for the touch panel scan rate is changed. For example, a time offset value is calculated and used as a basis to change when the next touch panel scan begins. According to an exemplary embodiment, by continuously monitoring touch panel scan events relative to display refresh events, the touch panel may be adjusted, when necessary, so that the touch panel scan events may occur as close in time as possible before the display refresh events. As a result, this may provide the system of the user device to receive the most recent touch event data (e.g., associated with the user's interaction with the touch/touchless panel and display) possible given the current load of the processor of the user device.

As a result of the foregoing, the synchronization service may minimize input delays, minimize power consumption, and minimize a load on the processor (e.g., a CPU). Additionally, the synchronization service may minimize variation in touch latencies, provide configuration options, and avert the work and costs associated with a hardware solution, as described herein.

Figure 1:
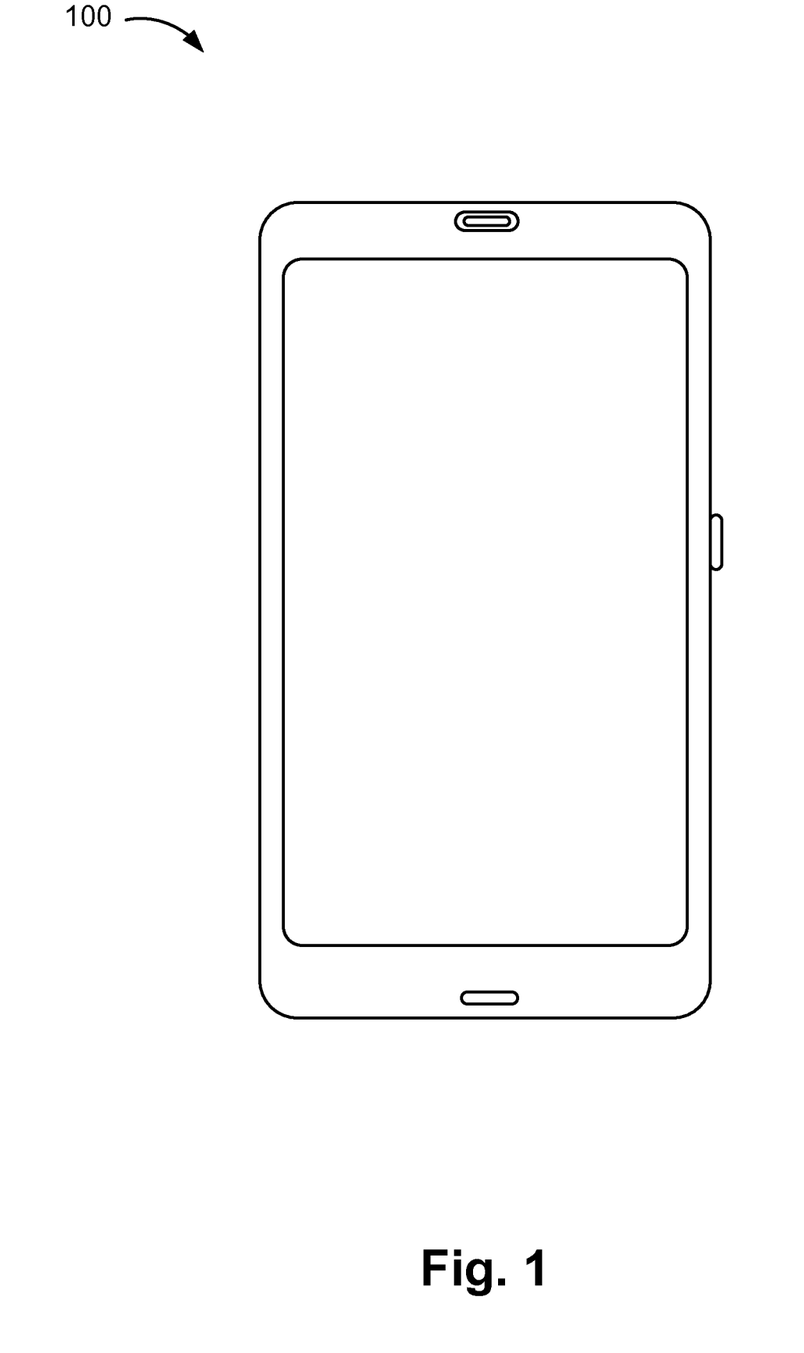
FIG. 1 is a diagram illustrating an exemplary user device in which an exemplary embodiment of a synchronization service may be implemented.

According to an exemplary embodiment, a user device provides a synchronization service, as described herein. FIG. 1 is a diagram of an exemplary user device 100 in which an exemplary embodiment of a synchronization service may be implemented. User device 100 may be implemented as a mobile device. For example, the mobile device may take the form of a smartphone, a personal digital assistant (PDA), a tablet device, a palmtop device, a netbook, a gaming device, a music playing device, or other computational device that includes a display (e.g., a laptop, a wrist device, a vehicular infotainment system, etc.), which may be configured to provide the synchronization service, as described herein. Alternatively, user device 100 may be implemented as a non-mobile device. For example, user device 100 may be implemented as a smart television, a display device, or other computational device (e.g., a kiosk) that includes a display, which may be configured to provide the synchronization service, as described herein. According to an exemplary embodiment, user device 100 may include a touch and/or touchless panel/display. According to another exemplary embodiment, user device 100 may be connected (e.g., via a wireless or wired connection) to a touch and/or touchless panel/display. For purposes of description, user device 100 is illustrated in FIG. 1 as a mobile device that includes a touch and/or touchless panel/display.

Figure 2:
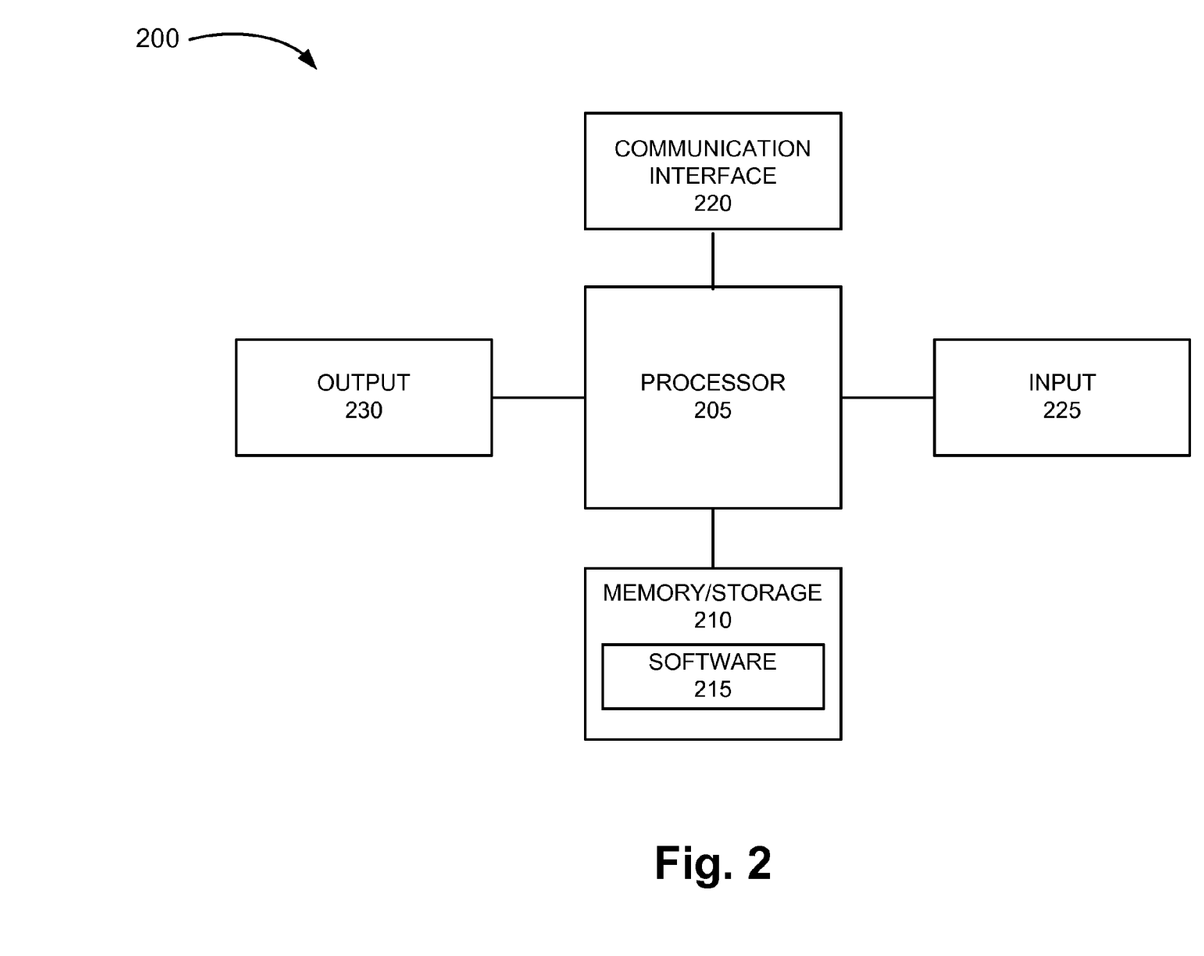
FIG. 2 is a diagram illustrating exemplary components of the user device.

FIG. 2 is a diagram illustrating exemplary components of user device 100 depicted in the previous figure and described herein. As illustrated, according to an exemplary embodiment, user device 100 includes a processor 205, memory/storage 210, software 215, a communication interface 220, an input 225, and an output 230. According to other embodiments, user device 100 may include fewer components, additional components, different components, and/or a different arrangement of components than those illustrated in FIG. 2 and described herein.

Processor 205 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 205 may be implemented as hardware (e.g., a microprocessor, etc.), a combination of hardware and software (e.g., a SoC, an ASIC, etc.), may include one or multiple memories (e.g., memory/storage 210), etc.

Processor 205 controls the overall operation or a portion of operation(s) performed by user device 100. Processor 205 performs one or multiple operations based on an operating system and/or various applications or programs (e.g., software 215). Processor 205 may access instructions from memory/storage 210, from other components of user device 100, and/or from a source external to user device 100 (e.g., a network, another device, etc.).

Memory/storage 210 includes one or multiple memories and/or one or multiple other types of storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 210 may include drives for reading from and writing to the storage medium.

Memory/storage 210 may be external to and/or removable from user device 100, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 210 may store data, software, and/or instructions related to the operation of user device 100.

Software 215 may include an application or a program that provides a function and/or a process. Software 215 may include firmware. By way of example, software 215 may comprise a telephone application, a multi-media application, an e-mail application, a contacts application, a calendar application, an instant messaging application, a web browsing application, a location-based application (e.g., a Global Positioning System (GPS)-based application, etc.), a camera application, etc. Software 215 includes an operating system (OS). For example, depending on the implementation of user device 100, the operating system may correspond to iOS, Android, Windows Phone, or another type of operating system (e.g., proprietary, BlackBerry OS, etc.).

As described herein, the synchronization service may be implemented, in part, using software 215. The synchronization service may also rely on processor 205 for the execution of software 215. Additionally, or alternatively, the synchronization service may include a dedicated processor/circuitry to execute software 215. Exemplary components of the synchronization service are described further below.

Communication interface 220 permits user device 100 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 operates according to one or multiple protocols, a communication standard, and/or the like.

Input 225 permits an input into user device 100. For example, input 225 may include a keyboard, a mouse, a display, a touchscreen, a touchless screen, a button, a switch, an input port, speech recognition logic, and/or some other type of visual, auditory, tactile, etc., input component. Output 230 permits an output from user device 100. For example, output 230 may include a speaker, a display, a touchscreen, a touchless screen, a light, an output port, and/or some other type of visual, auditory, tactile, etc., output component.

User device 100 may perform a process and/or a function in response to processor 205 executing software 215 stored by memory/storage 210. By way of example, instructions may be read into memory/storage 210 from another memory/storage 210 or read into memory/storage 210 from another device via communication interface 220. The instructions stored by memory/storage 210 causes processor 205 to perform the process or the function. Alternatively, user device 100 may perform a process or a function based on the operation of hardware (processor 205, etc.).

Figure 3A:
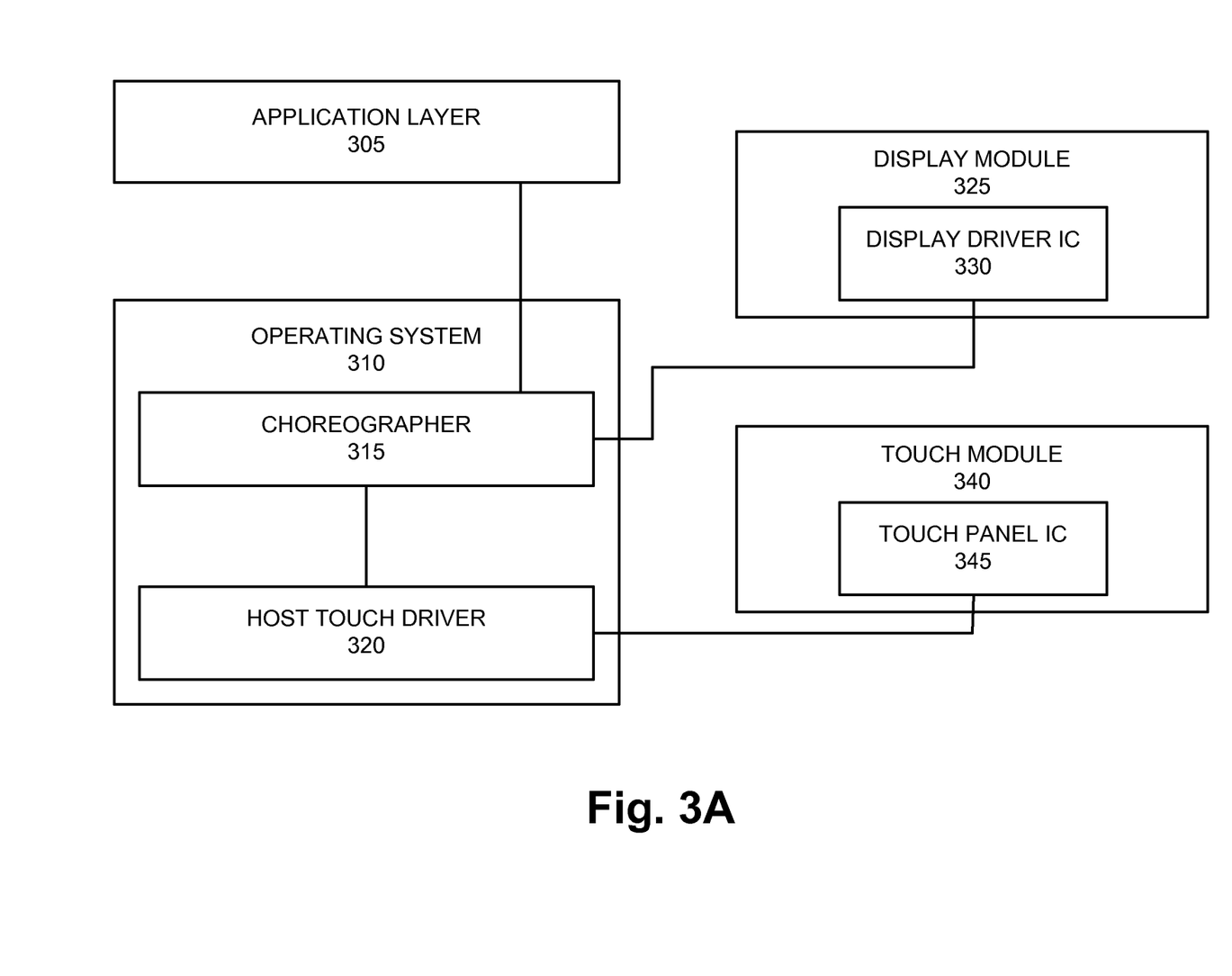
FIG. 3A is a diagram illustrating exemplary components of the synchronization service.

As previously described, according to an exemplary embodiment, user device 100 includes a synchronization service. Exemplary components that provide the synchronization service are described further below. Referring to FIG. 3A, according to an exemplary embodiment, user device 100 includes an application layer 305 and an operating system 310 that includes a choreographer 315 and a host touch driver 320. User device 100 also includes a display module 325 that includes a display driver integrated circuit (IC) 330, and a touch module 340 that includes a touch panel IC 345.

Application layer 305 includes a user interface, which is provided by an application (e.g., software 215) with which a user interacts. Operating system 310 includes the system software of user device 100. For purposes of description, operating system 310 corresponds to the Android OS. Choreographer 315 is a software entity of operating system 310 (i.e., of Android). In general, choreographer 315 is part of the Android event management framework. For example, choreographer 315 receives timing pulses (e.g., vertical synchronizations (VSYNCs)) from the display subsystem (e.g., display driver IC 330) and then schedules work to occur as part of rendering the next display frame. Additionally, choreographer 315 coordinates the user interface of application layer 305 with a VSYNC timing pulse (e.g., periodically every 16 ms). Applications of application layer 305 interact with choreographer 315 using higher level abstractions in the animation framework or the view hierarchy.

Although Android is described in relation to an exemplary embodiment of the synchronization service, according to other embodiments, an operating system 310, other than Android, may be used. Additionally, although choreographer 315 is described in relation to an exemplary embodiment of the synchronization service, according to other embodiments, a software entity, other than choreographer 315, may be used that operates or provides the functionality of choreographer 315.

Host touch driver 320 comprises logic to, for example, receive data from touch module 340, assemble the data into touch events, and publish the touch events on an operating system input event queue. Display module 325 comprises logic to, for example, control and/or integrate functions associated with the display of user device 100. For example, display module 325 comprises logic to control display driving and sensing circuits, power circuits, finger/instrument tracking, touchless tracking, and digital signal processing. Display driver IC 330 comprises logic to, for example, manage the display, such as enabling and disabling, power-state change notifications, and calibration functions.

Touch module 340 comprises a touchscreen, a touch board (e.g., touch panel IC 345), and touch sensors. Touch module 340 may use various touchscreen technologies, such as resistive, surface acoustic, capacitive, infrared, etc. Touch panel IC 345 comprises logic to, for example, calculate coordinates, amplify a user input signal, convert a user input signal into the digital domain, etc., relative to the user's input. Touch panel IC 345 also includes various connectors (e.g., host, touchscreen, etc.) and interfaces.

Generally, the touch panel scan rate is at least equivalent to the display refresh rate. However, the touch panel scan rate may be configured at rates greater than the display refresh rate. For example, the touch panel scan rate may be increased by a factor of 2, 3, 4, etc., relative to the display refresh rate. By way of further example, the touch panel scan rate may be configured at 120 Hertz (Hz) or 240 Hz, while the display refresh rate may be configured at 60 Hz. However, there are various trade-offs resulting from these rate configurations. For example, touch panel scan rates that are 2 or more times the display refresh rate yield greater power consumption of user device 100 and may increase the signal-to-noise ratio (SNR). Conversely, higher touch panel scan rates may collect more touch event data and increase touch quality (e.g., accuracy, gesture interpretation that provides smooth and complete shape of touch input, etc.). In contradistinction, a touch panel scan rate that is the same as the display refresh rate may reduce power consumption, collect less touch event data and reduce touch quality. However, depending on the use case, this may be acceptable. For example, when the user is using a virtual keypad, a high touch panel scan rate may not be necessary compared to when the user is using a handwriting application. Although display and scan rates are typically set when configuring the system of user device 100, their actual values may differ (e.g., by ±1-2 Hz) from the configuration. Consequently, these two components may drift apart from each other.

Figure 3B:
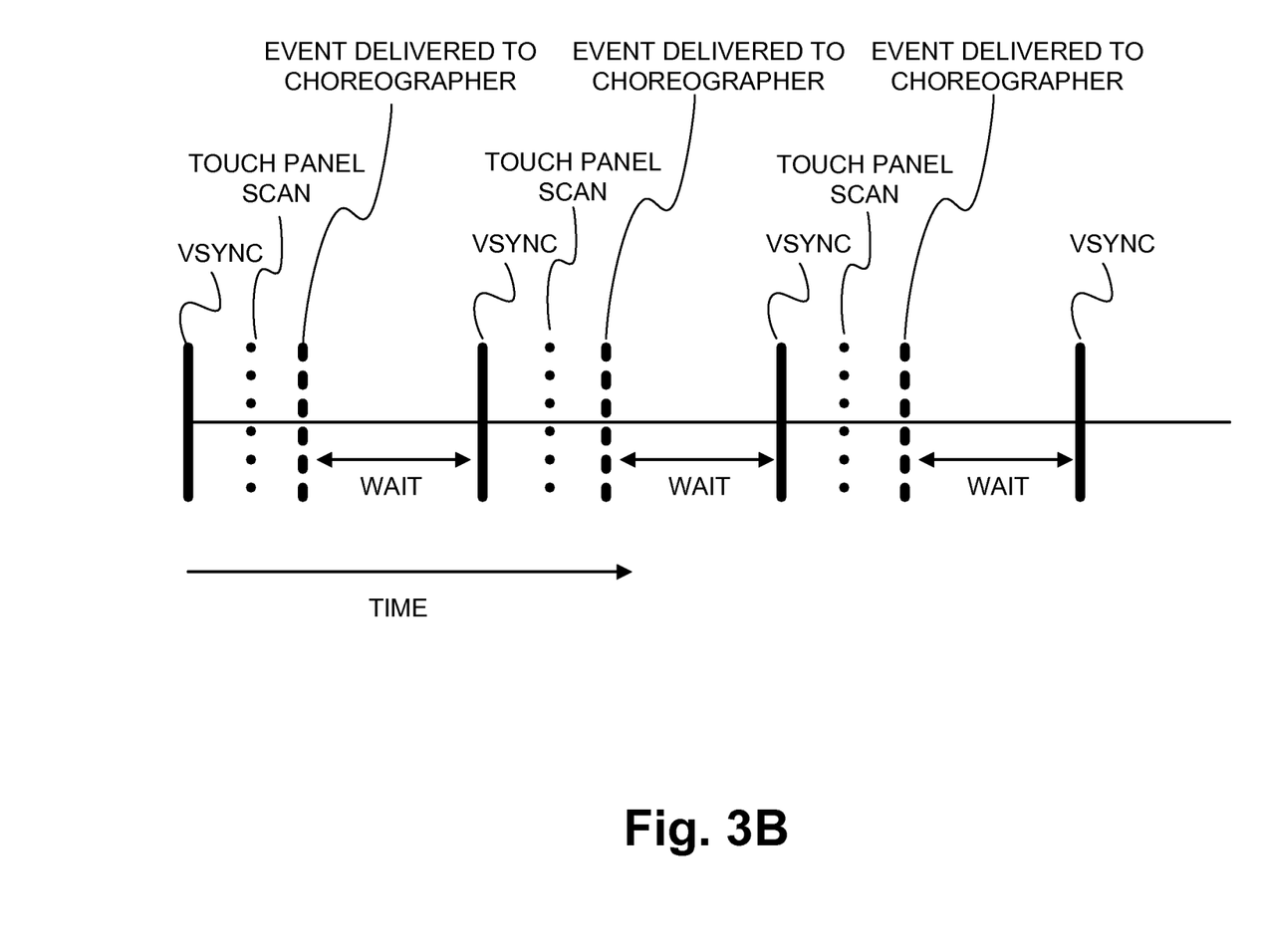
FIG. 3B is a timing diagram illustrating an exemplary scenario in which the synchronization service is not provided.

In addition to scan and display refresh rates, the timing of the scan event relative to the display refresh event is also a consideration. For example, referring to FIG. 3B, as illustrated, there are three events, namely the VSYNC, the touch panel scan, and the when an event is delivered to the choreographer. As previously described, the VSYNC events correspond to the display refresh events. The touch panel scan events correspond to the touch panel scans. The event delivered to choreographer corresponds to choreographer 315 receiving touch event data. For example, referring to FIG. 3A, when a user interacts with touch module 340 (e.g., a touch and/or touchless panel) of user device 100, touch event data is communicated from touch panel IC 345 to host touch driver 320, which in turn is communicated to choreographer 315. When choreographer 315 receives the touch event data is when the event is delivered. Referring back to FIG. 3B, as shown, there may be situations where a wait time is created between when the event is delivered to choreographer 315 and the next VSYNC event. This wait time can vary depending on, among other things, when the user happens to interact with the touch/touchless panel. Unfortunately, these type of situations yield, among other things, touch latency.

As previously described, according to an exemplary embodiment, the synchronization service includes setting the touch panel scan rate based on the display refresh rate. Additionally, for example, according to an exemplary embodiment, the synchronization service includes adjusting the timing of the touch panel scanning, which may result in effectively changing the phase of the touch panel scanning. An exemplary synchronization process is described below.

Figure 3C:
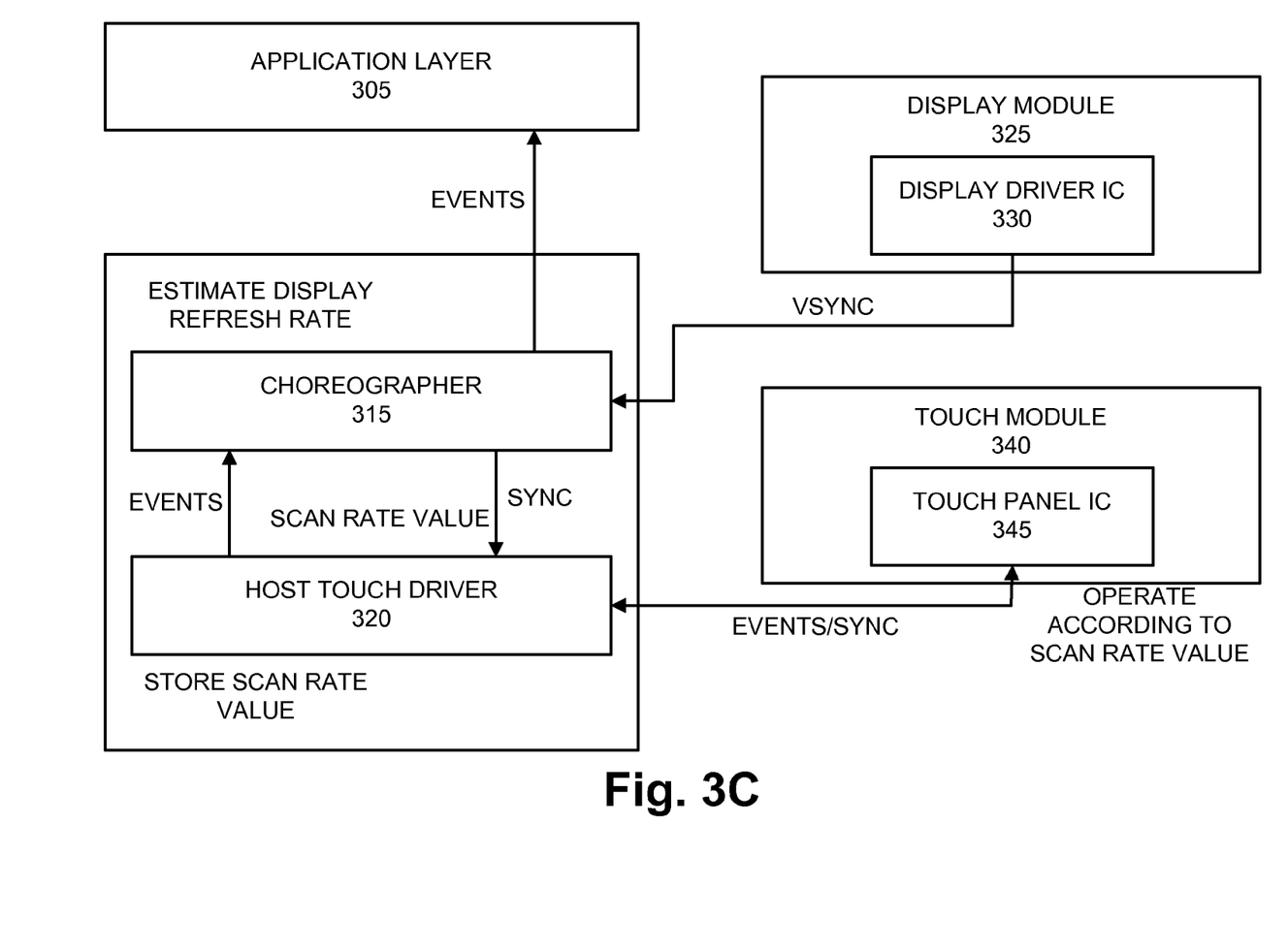
FIGS. 3C-3E are diagrams illustrating an exemplary process, which provides the synchronization service, based on the exemplary components illustrated in FIG. 3A.
Figure 3D:
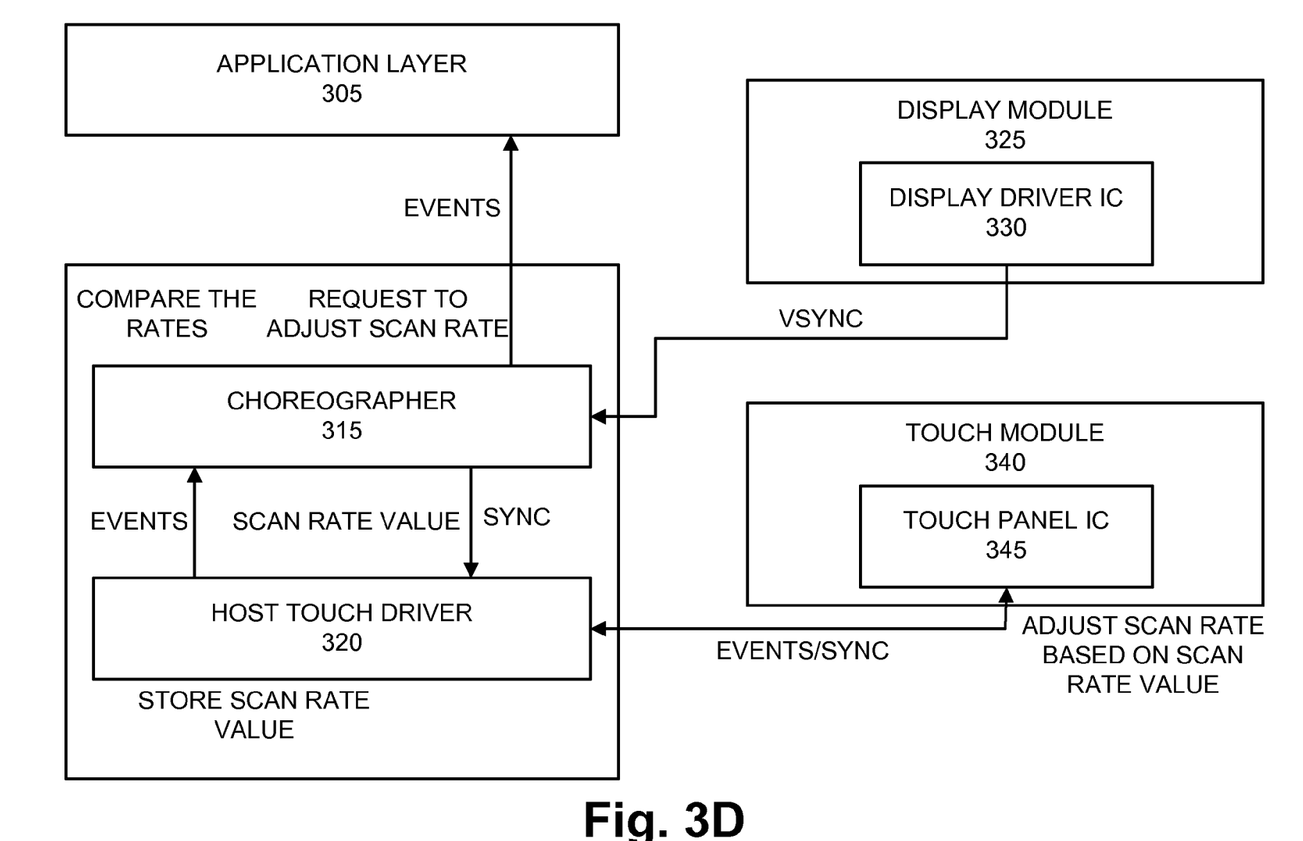
Figure 3E:
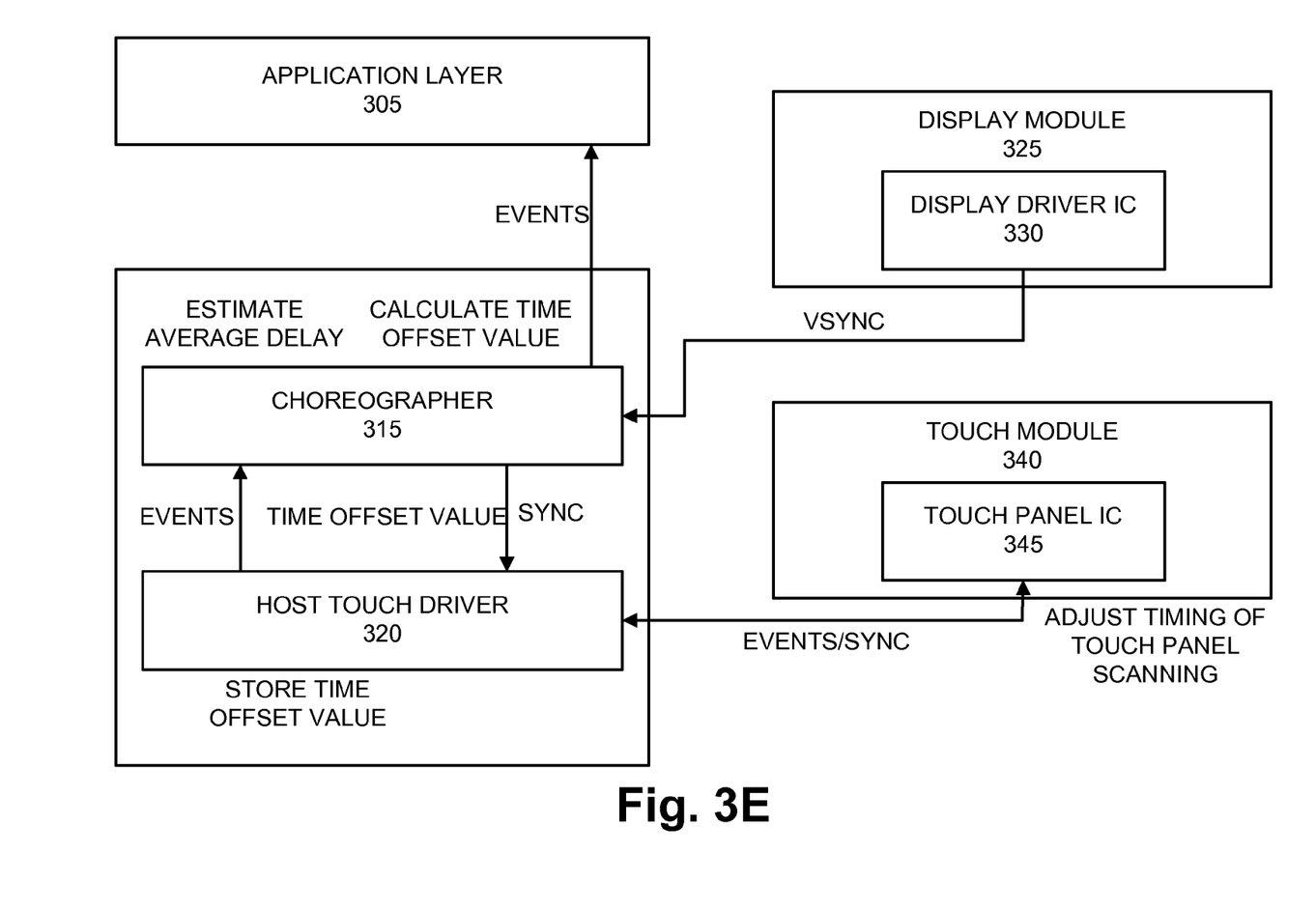

FIGS. 3C-3E are diagrams illustrating an exemplary process, which provides the synchronization service, based on the exemplary components illustrated in FIG. 3A. According to an exemplary scenario, assume that a user of user device 100 presses a button that causes user device 100 to wake-up. In response, as illustrated, choreographer 315 receives VSYNCs from display driver IC 330. Based on the received VSYNCs, choreographer 315 estimates the display refresh rate based on a timestamp for each VSYNC. Since each VSYNC event may vary stochastically, choreographer 315 uses a smoothing technique (e.g., exponential smoothing) to estimate the display refresh rate. Based on the estimated display refresh rate, choreographer 315 communicates a scan rate value (illustrated as a SYNC) to host touch driver 320. In turn, host touch driver 320 communicates the scan rate value (illustrated as a SYNC) to touch panel IC 345. For example, host touch driver 320 stores the scan rate value in a register of touch panel IC 345. Subsequently, touch panel IC 345 operates according to the scan rate value.

Subsequently, the user interacts with the touch and/or touchless panel/display. Choreographer 315 continuously estimates the display refresh rate and host touch driver 320 continuously estimates the touch panel scan rate. Referring to FIG. 3D, host touch driver 320 communicates the estimated touch panel scan rate to choreographer 315. In turn, choreographer 315 compares the estimated display refresh rate with the estimated touch panel scan rate. According to an exemplary embodiment, if the difference between the refresh rate and scan rate is greater than a threshold value, choreographer 315 determines to adjust the scan rate. For example, similar to that previously described in relation to FIG. 3C, choreographer 315 communicates a scan rate value to host touch driver 320, and in turn, via host touch driver 320, this value is stored in a register of touch panel IC 345. Subsequently, touch panel IC 345 operates according to the scan rate value.

According to another exemplary embodiment, choreographer 315 determines whether to adjust the scan rate based on the current usage. For example, assume the scan rate is set at 120 Hz and the display refresh rate is set at 60 Hz. Depending on the application with which the user is interacting, choreographer 315 may determine to adjust the scan rate to 60 Hz or maintain the scan rate at 120 Hz. For example, if the user is interacting with a keypad user interface, choreographer 315 may determine to reduce the scan rate to the same frequency as the display refresh rate (i.e., 60 Hz). As a result, such a reduction of the scan rate reduces power consumption of user device 100, etc., as previously described. According to another example, if the user is interacting with a handwriting application, choreographer 315 may determine to maintain the scan rate at 120 Hz, or increase the scan rate to 240 Hz or some other integer multiple of the display refresh rate. According to other embodiments, choreographer 315 may consider other factors, such as current battery life, current processor load, etc., when determining whether to adjust the scan rate and to what scan rate value to select. Also, when the touch scan rate is a multiple of the display refresh rate, choreographer 315 may adjust the time of the touch scan towards a display refresh event and an intermediary time between display refresh events. For example, if the scan rate is 120 Hz and the display refresh rate is 60 Hz, choreographer 315 may adjust the scan rate events to correspond to the VSYNC and half the Vsync. Of course, in this example, the synchronization of the scan event to the VSYNC should naturally result in the synchronization to a midpoint in time between VSYNCs given the scan rate is at 120 Hz. However, choreographer 315 may select either a midpoint in time or a time in synch with VSYNC to use when adjusting the scan rate.

Figure 3F:
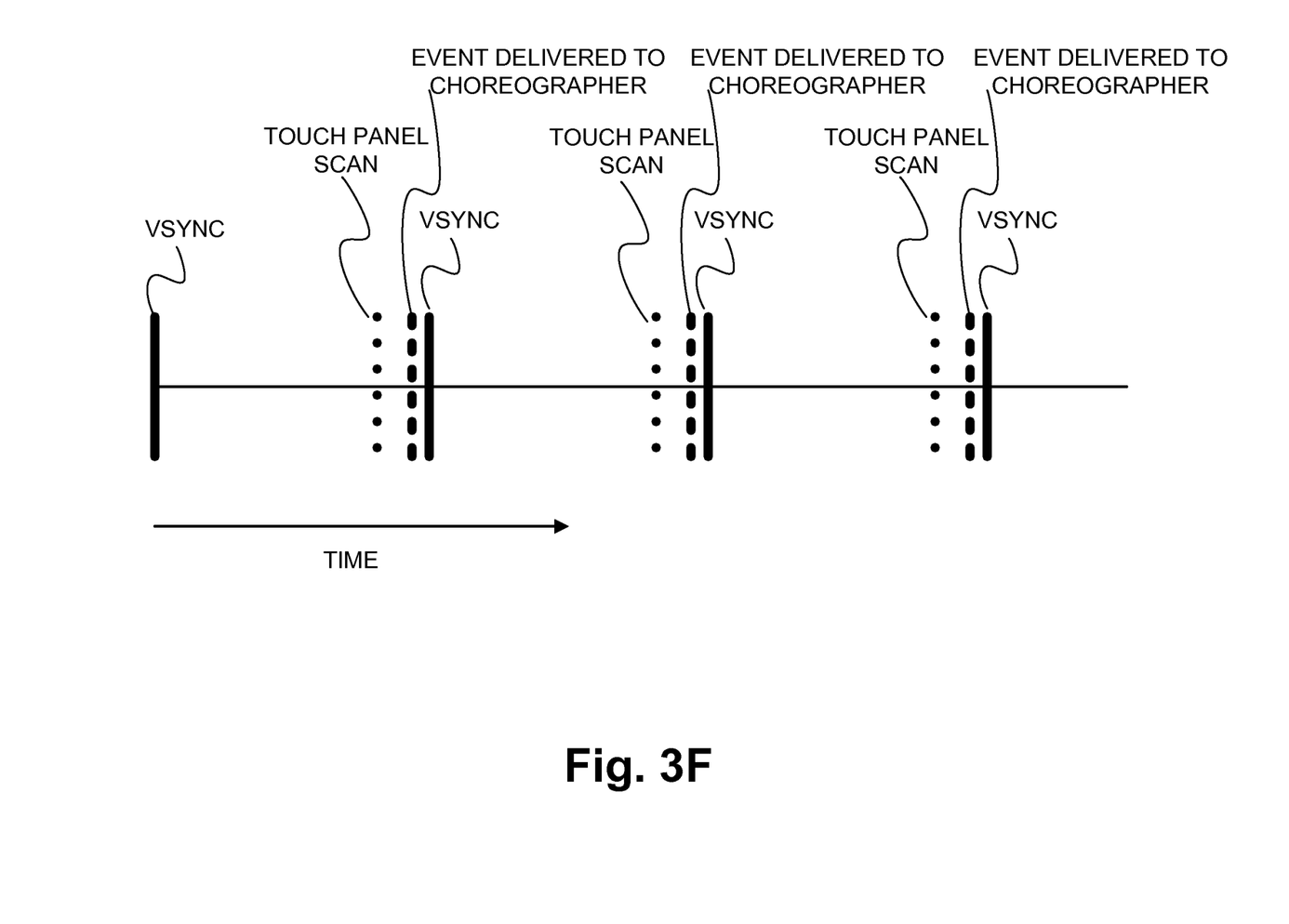
FIG. 3F is a timing diagram illustrating an exemplary scenario in which the synchronization service is provided.

Additionally, referring to FIG. 3E, choreographer 315 estimates the average delay (Dt) between the reception of a touch event and the next VSYNC event. For example, referring back to FIG. 3B, the wait time constitutes a delay between the reception of a touch event by choreographer 315 and the next VSYNC event. If the average delay (Dt) is outside a range (e.g., [Dtmax, Dtmin] ms), choreographer 315 calculates a time offset value to adjust the timing of touch panel scanning. If the average delay is not outside the range, then no adjustment is made. For purposes of description, assume the average delay (Dt) is outside the range. As illustrated in FIG. 3E, according to this example, choreographer 315 calculates a time offset value, which is communicated to host touch driver 320. In turn, host touch driver 320 stores the time offset value in register of touch panel IC 345. Touch panel IC 345 adjusts the timing of the touch panel scanning based on the time offset value. As a result, for example, referring to FIG. 3F, choreographer 315 adjusts the timing of the touch panel scanning to cause touch panel scan events to occur closer in time relative to VSYNC events as compared to the timing diagram of FIG. 3B. Additionally, the touch event data is received by choreographer 315, closer in time, relative to VSYNC events compared to the timing diagram of FIG. 3B.

The average delay (Dt) depends on the initial phase difference between the display refresh rate and the touch panel scan rate, and the current load on the processor (e.g., processor 205). That is, referring to FIG. 3E, the elapsed time period for touch events (illustrated as "EVENTS") communicated from touch panel IC 345 to reach choreographer 315, via host touch driver 320, is impacted based on the load of the processor (e.g., processor 205) during that time period. Since the load varies over time, in turn, so does the elapsed time. However, as described, the synchronization service adapts to these variations based on an adjustment of the timing (or phase) of the touch panel scanning. That is, as described herein, touch panel IC 345 may be controlled as to when to start a touch panel scan so as to sync the touch panel scan event with the VSYNC event. This synchronization may minimize wait time and minimize the time between the scan and when the touch event should be delivered to choreographer 315.

Figure 3G:
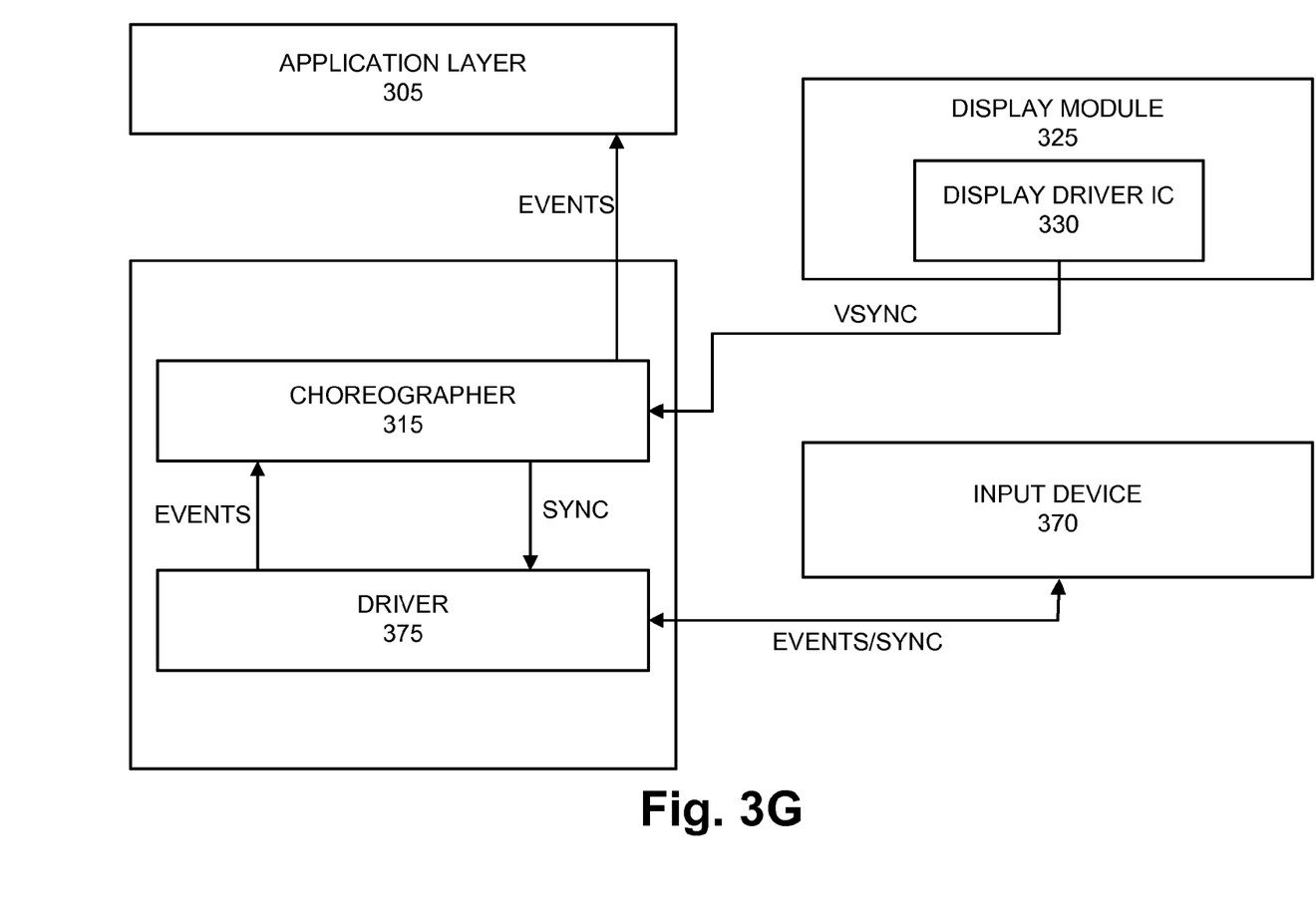
FIG. 3G is a diagram illustrating exemplary components of the synchronization service.

FIG. 3G is a diagram illustrating exemplary components of the synchronization service. In contrast to FIG. 3A, in which touch module 340 and touch panel 345 communicate with choreographer 315 via host touch driver 320, an input device 370 and a driver 375 are illustrated. That is, according to an exemplary embodiment, the synchronization service may be implemented for any input device 370, such as a mouse, a touchpad, a trackball, a sensor, etc. Input device 370 and/or driver 375 of input device 370 may provide a feature (e.g., a periodic sampling of input, a scanning of input, etc.) corresponding to touch/touchless scanning as previously described. Thus, in a manner similar to that described herein with respect to touch module 340/touch panel IC 345, choreographer 315 may update input scanning based on estimated display refresh events, compare timings between input scanning events and display refresh events, and update the timing of input scanning.

Figure 4:
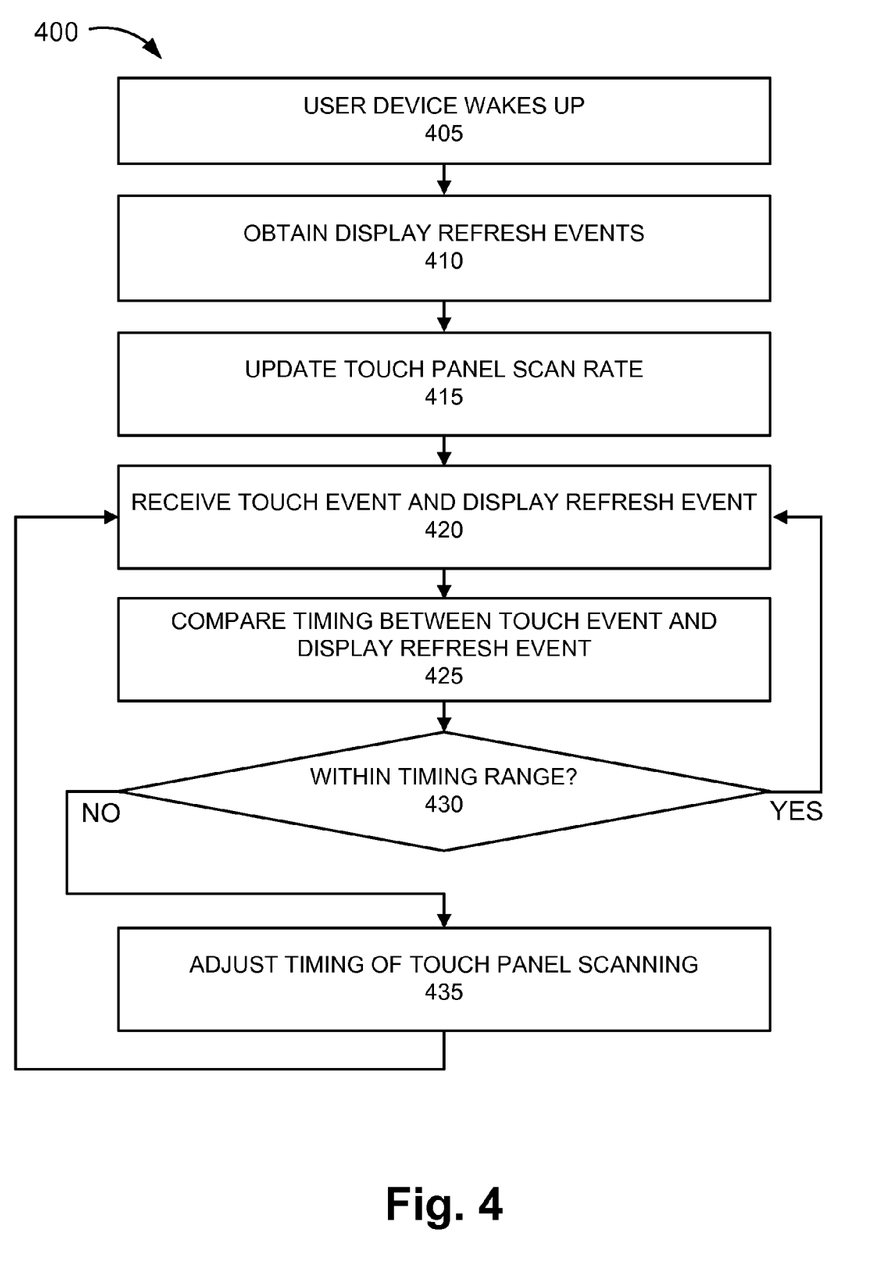
FIG. 4 is a flow diagram illustrating an exemplary process to provide a synchronization service.

FIG. 4 is a flow diagram illustrating an exemplary process 400 to provide the synchronization service. A step or an act described in process 400 may be performed by one or multiple components of user device 100. For example, processor 205 may execute software 215 to perform the step described.

Referring to FIG. 4, in block 405, the user device wakes up. For example, a user of user device 100 causes user device 100 (e.g., by pressing a button, etc.) to wake up. Alternatively, block 405 may pertain to when the user initially turns on (e.g., powers up). user device 100. In block 410, display refresh events are received. For example, as a consequence of user device 100 waking up or powering up, the display of user device 100 is activated and choreographer 315 receives timestamped VSYNCs from display driver IC 330.

In block 415, the touch panel scan rate is updated. For example, as previously described, choreographer 315 estimates the display refresh rate based on the received timestamped VSYNCs. Choreographer 315 sets the touch panel scan rate of touch panel IC 345 via host touch driver 320. For example, host touch driver 320 receives a scan rate value. Host touch driver 320 stores the scan rate value in a register of touch panel IC 345. Touch panel IC 345 updates the touch panel scan rate based on the scan rate value.

In block 420, a touch event and a display refresh event is received. For example, choreographer 315 receives touch event data in response to the user interacting with the touch and/or touchless panel/display. Additionally, choreographer 315 receives a VSYNC.

In block 425, the timing between the touch event and the display refresh event is compared. For example, choreographer 315 compares when the touch event data is received to when the VSYNC is received. Based on the comparison, choreographer 315 determines the time difference between these events.

In block 430, it is determined whether the time difference is within a timing range. For example, choreographer 315 determines whether the time difference is within a time window (e.g., [Dtmin, Dtmax]). If it is determined that that the time difference is within the timing range (block 430—YES), then process 400 continues to block 420. For example, choreographer 315 determines that adjustment of the touch panel scanning is not necessary. Choreographer 315 may also determine whether to update the touch panel scan rate in accordance with embodiments described.

If it is determined that the time difference is not within the timing range (block 430—NO), then the timing of the touch panel scanning is adjusted (block 435). For example, choreographer 315 calculates a time offset value (e.g., +2 milliseconds forward in time from the next scheduled touch panel scan) based on a particular time window (e.g., [Dtmin, Dtmax]) and the current timing of the touch panel scanning. Choreographer 315 communicates the time offset value to host touch driver 320. In response, host touch driver 320 stores the time offset value in a register of touch panel IC 345. Touch panel IC changes the time during which the next touch panel scan event begins (e.g., reschedules) based on the time offset value. Alternatively, choreographer 315 may calculate a timestamp value that indicates a system time with a precision of milliseconds for when the next touch panel scan should occur. Similarly, the timestamp value may be stored in the register of the touch panel IC 345. In either case, touch panel IC 345 may be operate according to the time value (e.g., time offset value or timestamp value). Choreographer 315 may also determine whether to update the touch panel scan rate in accordance with embodiments described.

Although FIG. 4 illustrates an exemplary process 400 to provide the synchronization service, process 400 may include additional operations, fewer operations, and/or different operations than those illustrated in FIG. 4, and as described. For example, the touch scan rate and timing of the touch scanning may be managed relative to various contexts (e.g., application used by the user, current available power of user device 100 (e.g., battery level), etc.) and states of user device 100 (e.g., transitions from idle to active, active to idle, etc.).

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 4, the order of the blocks may be modified according to other embodiments. Further, non-dependent blocks may be performed in parallel.

Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 205, a dedicated processor (not illustrated), etc.) or a combination of hardware and software (e.g., software 215). The embodiments have been described without reference to the specific software code since software can be designed to implement the embodiments based on the description herein and the accompanying drawings.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 210.

The terms "comprise," "comprises" or "comprising," as well as synonyms thereof (e.g., include, etc.), when used in the specification is meant to specify the presence of stated features, integers, steps, or components but does not preclude the presence or addition of one or more other features, integers, steps, components, or groups thereof. In other words, these terms are to be interpreted as inclusion without limitation.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   receiving, by a user device, a touch event originating from a touch panel;
   comparing, by the user device, a timing of the touch event and a timing of a display refresh event;
   determining, by the user device, whether to adjust a time during which a next scan of the touch panel occurs based on the comparing;
   calculating, by the user device, a time value that indicates when the next scan occurs based on determining to adjust the time; and
   adjusting, by the user device, the time during which the next scan occurs based on the time value,
   wherein the determining comprises:
      calculating a time difference between the timing of the touch event and the timing of the display refresh event;
      comparing the time difference to a timing window that indicates a timing range;
      determining whether the time difference falls outside of the timing window; and
      adjusting the time during which the next scan occurs based on determining that the time difference falls outside of the timing window.

2. The method of claim 1, further comprising:
   obtaining display refresh events;
   calculating a display refresh rate based on the obtaining; and
   setting a scan rate for the touch panel based on the display rate.

3. The method of claim 2, further comprising:
   determining a type of application to which the touch event pertains; and
   determining whether to increase the scan rate, decrease the scan rate, or maintain the scan rate based on the type of application.

4. The method of claim 2, further comprising:
   obtaining scan rate events pertaining to the touch panel;
   calculating an estimated scan rate based on obtaining the scan rate events; and
   setting the scan rate based on the display refresh rate and the estimated scan rate.

5. The method of claim 2, further comprising:
   determining a battery level of the user device; and
   setting the scan rate based on the battery level.

6. The method of claim 1, further comprising:
   storing the time value in a register, wherein the time value is a time offset value or a timestamp value; and
   using the time value to set the time during which the next scan occurs.

7. The method of claim 1, wherein the display refresh event varies stochastically.

8. The method of claim 1, wherein the time difference is based on at least an initial phase difference between the display refresh event and the touch event.

9. The method of claim 8, wherein the time difference is additionally based on a load on a processor.

10. A user device comprising:
    a memory, wherein the memory stores software; and
    a processor, wherein the processor executes the software to:
       receive a touch event originating from a touch panel;
       compare a timing of the touch event and a timing of a display refresh event;
       determine whether to adjust a time during which a next scan of the touch panel occurs based on a comparison of the timing of the touch event and the timing of the display refresh event;
       calculate a time value that indicates when the next scan occurs based on a determination to adjust the time; and
    adjust the time during which the next scan occurs based on the time value, wherein the processor further executes the software to:
    calculate a time difference between the timing of the touch event and the timing of the display refresh event;
    compare the time difference to a timing window that indicates a timing range;
    determine whether the time difference falls outside of the timing window; and adjust the time during which the next scan occurs based on a determination that the time difference falls outside of the timing window.

11. The user device of claim 10, wherein the software includes an operating system of the user device.

12. The user device of claim 11, wherein the operating system includes a choreographer.

13. The user device of claim 10, wherein the processor further executes the software to:
obtain display refresh events;
calculate a display refresh rate based on the obtained display refresh events; and
set a scan rate for the touch panel based on the display rate, wherein the obtained display refresh events correspond to vertical synchronization signals.

14. The user device of claim 13, wherein the processor further executes the software to:
determine a type of application to which the touch event pertains; and
determine whether to increase the scan rate, decrease the scan rate, or maintain the scan rate based on the type of application.

15. The user device of claim 10, wherein the touch panel includes a panel with at least one of touch or touchless capabilities, and the user device further comprising:
the touch panel; and
a display.

16. The user device of claim 10, wherein the user device is a mobile communicative device.

17. A non-transitory storage medium that stores instructions executable by a processor of a computational device, which when executed, cause the computational device to:
receive an input event originating from an input device;
compare a timing of the input event and a timing of a display refresh event;
determine whether to adjust a time during which a next scan or sampling of the input device occurs based on a comparison of the timing of the input event and the timing of the display refresh event;
calculate a time value that indicates when the next scan or sampling occurs based on a determination to adjust the time; and
adjust the time during which the next scan or sampling occurs based on the time value,
wherein the instructions comprise instructions to:
calculate a time difference between the timing of the input event and the timing of the display refresh event;
compare the time difference to a timing window;
determine whether the time difference falls outside of the timing window; and
adjust the time during which the next scan or sampling occurs based on a determination that the time difference falls outside of the timing window.

18. The non-transitory storage medium of claim 17, wherein the instructions comprise instructions to:
obtain display refresh events pertaining to a display;
calculate a display refresh rate based on the obtained display refresh events; and
set a scan rate or a sampling rate for the input device based on the display refresh rate, wherein the obtained display refresh events correspond to vertical synchronization signals.

19. The non-transitory storage medium of claim 18, wherein the instructions comprise instructions to:
determine a type of application to which the input event pertains; and
determine whether to increase the scan rate or the sampling rate, decrease the scan rate or the sampling rate, or maintain the scan rate or the sampling rate based on the type of application, wherein the input device is one of a touch panel, a mouse, a tracking ball, or a sensor.

20. The non-transitory storage medium of claim 18, wherein the instructions comprise instructions to:
obtain scan rate events or sampling events pertaining to the input device;
calculate an estimated scan rate or an estimated sampling rate based on the scan rate events or the sampling events; and
set the scan rate or the sampling rate based on the display refresh rate and the estimated scan rate or the estimated sampling rate.

* * * * *